(12) United States Patent
Wang et al.

(10) Patent No.: US 10,127,439 B2
(45) Date of Patent: Nov. 13, 2018

(54) OBJECT RECOGNITION METHOD AND APPARATUS

(71) Applicant: SAMSUNG ELECTRONICS CO., LTD., Suwon-si (KR)

(72) Inventors: Xiaotao Wang, Beijing (CN); Qiang Wang, Beijing (CN); Ping Guo, Beijing (CN); Shandong Wang, Beijing (CN); Wentao Mao, Beijing (CN); Guangqi Shao, Beijing (CN); Eric Hyunsurk Ryu, Hwaseong-si (KR); Kyoobin Lee, Seoul (KR); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 14/995,275

(22) Filed: Jan. 14, 2016

(65) Prior Publication Data

US 2016/0210513 A1    Jul. 21, 2016

(30) Foreign Application Priority Data

Jan. 15, 2015 (CN) .......................... 2015 1 0019275
Dec. 8, 2015 (KR) ........................ 10-2015-0173971

(51) Int. Cl.
 *G06K 9/00* (2006.01)
 *G06K 9/46* (2006.01)
 *G06K 9/62* (2006.01)

(52) U.S. Cl.
 CPC ....... *G06K 9/00362* (2013.01); *G06K 9/4628* (2013.01); *G06K 9/4647* (2013.01); *G06K 9/629* (2013.01)

(58) Field of Classification Search
 None
 See application file for complete search history.

(56) References Cited

U.S. PATENT DOCUMENTS

| 7,295,687 | B2 | 11/2007 | Kee et al. |
| 7,330,566 | B2 | 2/2008 | Cutler |
| 7,565,006 | B2 | 7/2009 | Stam et al. |
| 7,747,070 | B2 | 6/2010 | Puri |
| 9,530,047 | B1 * | 12/2016 | Tang ................. G06K 9/00288 |
| 9,846,677 | B2 * | 12/2017 | Wang ................. G06F 17/141 |
| 2007/0030391 | A1 * | 2/2007 | Kim ................. G06K 9/00751 348/564 |
| 2007/0112709 | A1 * | 5/2007 | Luo ...................... G06K 9/6256 706/45 |
| 2008/0062125 | A1 * | 3/2008 | Kitaura .................. G06F 3/017 345/157 |

(Continued)

FOREIGN PATENT DOCUMENTS

| JP | 11-120158 A | 4/1999 |
| JP | 4978227 B2 | 7/2012 |

(Continued)

*Primary Examiner* — Delomia L Gilliard
(74) *Attorney, Agent, or Firm* — Sughrue Mion, PLLC

(57) ABSTRACT

An object recognition apparatus and an object recognition method are provided. The object recognition method includes generating an input image based on an event flow of an object, generating a composite feature based on features extracted by a plurality of recognizers, and recognizing the object based on the composite feature.

26 Claims, 10 Drawing Sheets

(56) References Cited

U.S. PATENT DOCUMENTS

| | | | |
|---|---|---|---|
| 2009/0161912 A1* | 6/2009 | Yatom | G06K 9/6292 |
| | | | 382/103 |
| 2012/0183203 A1* | 7/2012 | Han | G06K 9/00201 |
| | | | 382/154 |
| 2014/0064623 A1* | 3/2014 | Kang | G06K 9/46 |
| | | | 382/195 |
| 2014/0085191 A1 | 3/2014 | Gonion et al. | |
| 2014/0139429 A1 | 5/2014 | Menadeva et al. | |
| 2014/0152899 A1 | 6/2014 | Newell | |
| 2014/0161322 A1* | 6/2014 | Cheng | A63B 24/00 |
| | | | 382/107 |
| 2014/0184774 A1 | 7/2014 | Miura et al. | |
| 2014/0184812 A1 | 7/2014 | Tsuji | |
| 2014/0187223 A1 | 7/2014 | Ivanchenko et al. | |
| 2014/0270508 A1* | 9/2014 | Retterath | G06K 9/3233 |
| | | | 382/165 |
| 2015/0036920 A1* | 2/2015 | Wu | G06N 3/0454 |
| | | | 382/156 |
| 2015/0095360 A1* | 4/2015 | Vrcelj | G06F 17/30061 |
| | | | 707/758 |
| 2015/0102216 A1* | 4/2015 | Roder | G06F 19/24 |
| | | | 250/282 |
| 2015/0161522 A1* | 6/2015 | Saon | G06N 3/08 |
| | | | 706/12 |
| 2015/0379371 A1* | 12/2015 | Yoon | G06K 9/6289 |
| | | | 382/103 |
| 2016/0070673 A1* | 3/2016 | Wang | G06F 17/141 |
| | | | 708/403 |
| 2016/0078001 A1* | 3/2016 | Wang | G06F 17/141 |
| | | | 708/405 |
| 2016/0140436 A1* | 5/2016 | Yin | G06N 3/08 |
| | | | 706/20 |
| 2016/0203610 A1* | 7/2016 | Lee | G06K 9/00221 |
| | | | 382/103 |
| 2016/0210513 A1* | 7/2016 | Wang | G06K 9/00362 |
| 2016/0217344 A1* | 7/2016 | Misra | G06K 9/6227 |
| 2016/0335432 A1* | 11/2016 | Vatamanu | G06F 21/552 |
| 2016/0342863 A1* | 11/2016 | Kwon | G06K 9/4647 |
| 2017/0083754 A1* | 3/2017 | Tang | G06T 7/0087 |
| 2017/0091953 A1* | 3/2017 | Bleiweiss | G06T 7/2033 |
| 2017/0169315 A1* | 6/2017 | Vaca Castano | G06K 9/6814 |
| 2017/0287170 A1* | 10/2017 | Perona | G06T 7/97 |
| 2017/0351936 A1* | 12/2017 | Jiang | G06K 9/6256 |

FOREIGN PATENT DOCUMENTS

| | | |
|---|---|---|
| JP | 5513960 B2 | 6/2014 |
| KR | 10-0316784 B1 | 3/2002 |
| KR | 10-0338473 B1 | 5/2002 |
| KR | 10-0389004 B1 | 6/2003 |
| KR | 10-0926783 B1 | 11/2009 |
| KR | 10-1122857 B1 | 3/2012 |

* cited by examiner

OBJECT RECOGNITION METHOD AND APPARATUS

CROSS-REFERENCE TO RELATED APPLICATION

This application claims priority from Chinese Patent Application No. 201510019275.4 filed on Jan. 15, 2015, in the State Intellectual Property Office of the People's Republic of China and Korean Patent Application No. 10-2015-0173971 filed on Dec. 8, 2015 in the Korean Intellectual Property Office, the disclosures of which are incorporated herein by reference in their entirety.

BACKGROUND

1. Field

Methods and apparatuses consistent with exemplary embodiments relate to an object recognition method and apparatus.

2. Description of the Related Art

With an increasing desire for enhanced security, an object identification technique has been widely applied to various fields such as a monitoring system, an access control system, a smart device, and the like. As an example, prior to a smart device being unlocked, identity verification may be performed on a user. When a verified identity matches a pre-registered user, the smart device may be unlocked. When the verified identity does not match the pre-registered user, the smart device may remain locked or provide alert notification. Here, the smart device may include, for example, a smartphone, smart glasses, a smart television (TV), smart furniture, and a smart vehicle.

The identity verification may be based on two methods in general. In one method, the identity verification may be performed using authentication equipment, for example, a key, an identification (ID) card, and a smart card. In another method, the identity verification may be performed based on authentication information, for example, a verbal order, a password, and a preset manipulation. As an example, the identity verification may be performed by inputting a password and verifying the input password through an interactive interface of a smartphone. As another example, the identity verification may be performed by sliding a block on a screen of the smartphone based on a preset pattern or connecting points on the screen based on a preset order.

However, the authentication information such as the password and the verbal order and the authentication equipment such as the key and the smart card may have a risk of an identity theft and thus, ensure a relatively low security. A manipulation, for example, inputting the password or connecting the points on the screen, for performing the identity verification based on the methods may cause an inconvenience of a user. Also, a manipulation performed through a screen touch and a manipulation performed with two hands may reduce a positive experience of the user.

A human attribute may be more robust against identity theft when compared to using the authentication information and the authentication equipment. An identity verification method using the human attribute has been known as a method that ensures a relatively high security. In the identity verification method using the human attribute, an identity of a user may be verified by acquiring user information including, for example, an eye image, a facial image, a hand image, and a gesture image, using a photographing device such as a charge-coupled device (CCD) and a complementary metal oxide semiconductor (CMOS), and matching the acquired user image information and pre-registered user image information.

The identity verification method using the human attribute may be performed by using a relatively large amount of energy. Although an operation of awakening and unlocking a device is applied to reduce energy consumption, the operation may increase a number of manipulations. Accordingly, there is a desire for a method of identity verification performed through a simple manipulation at low energy consumption.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided an object recognition method including generating an image based on an event flow of an object generating, based on the generated image, a plurality of region of interest (ROI) images corresponding to a plurality of ROIs, inputting the plurality of ROI images to a plurality of recognizers, the recognizers being configured to extract features of the plurality of ROIs, generating a composite feature based on the features extracted by the plurality of recognizers, and recognizing the object based on the composite feature. The object may be sensed by an event-based vision sensor. Also, the plurality of ROIs may be defined in advance.

The object recognition method may further include extracting, by each of the plurality of recognizers, the features of the plurality of ROIs from the plurality of ROI images, respectively, wherein the plurality of ROI images may be input to the plurality of recognizers in parallel.

The generating of the composite feature may include combining the features extracted by the plurality of recognizers, and generating the composite feature based on a result of the combining.

The plurality of recognizers may include a multiple-input convolutional neural network (CNN) including a plurality of CNNs, and the multiple-input CNN may have a multiple-input and single-output (MISO) architecture configured to extract the composite feature for identifying the object from the plurality of ROI images input to the plurality of CNNs in parallel.

At least one of the plurality of recognizers may include a convolution layer to perform a convolutional operation on an input ROI image, a pooling layer to sample an output of the convolution layer, and a full connection layer to extract a feature of an ROI based on a full connection network and an output of the pooling layer.

When the object is a person, the plurality of ROIs may include at least one from among regions corresponding to an entire body, a head, an upper half body, a lower half body, a leg, and an arm.

The generating of the input image may include detecting a bounding box of the object through a vertical projection and a horizontal projection, and generating the image based on the bounding box.

The generating of the plurality of ROI images may include extracting a pre-defined ROI including a target of interest of the object from the image, generating a ROI image based on the pre-defined ROI, acquiring a width and a height of the target of interest based on the ROI image, resizing the ROI image based on a preset distance using the width and the height, and generating the plurality of ROIs based on the resized ROI image.

The acquiring may include acquiring the width of the target of interest by applying a vertical projection to the ROI image, and acquiring the height of the target of interest based on a fixed ratio of the target of interest to the width.

The object recognition method may further include outputting validities of the plurality of ROI images using a filter configured to classify the validities, and inputting the plurality of ROI images to the plurality of recognizers based on a result of the outputting.

The generating of the image may include generating an integral image of a pre-defined time based on the event flow, filtering the integral image using a spatio-temporal filter, and generating the image based on the filtered integral image.

According to another aspect of an exemplary embodiment, there is also provided an object registration method including generating an image based on an event flow of an object generating, based on the image, a plurality of ROI images corresponding to a plurality of ROIs, inputting the plurality of ROI images to a plurality of recognizers, the recognizers being configured to extract features of the plurality of ROIs, generating a composite feature based on the features extracted by the plurality of recognizers, and registering the object in connection with the composite feature.

According to still another aspect of an exemplary embodiment, there is also provided an object registration apparatus including an image generator configured to generate an image based on an event flow of an object an ROI image generator configured to generate a plurality of ROI images corresponding to a plurality of ROIs based on the image, an inputter configured to input the plurality of ROI images to a plurality of recognizers, the recognizers being configured to extract features of the plurality of ROIs, a composite feature generator configured to generate a composite feature based on the features extracted by the plurality of recognizers, and an object recognizer configured to recognize the object based on the composite feature.

The object recognition apparatus may further include a feature extractor configured to extract the features of the plurality of ROIs from the plurality of ROI images, respectively, wherein the plurality of ROI images may be input to the plurality of recognizers in parallel.

The composite feature generator may be configured to combine the features extracted through the plurality of recognizers and generate the composite feature based on a result of the combining.

The image generator may be configured to generate an integral image of a pre-defined time based on the event flow, filter the integral image using a spatio-temporal filter, and generate the image based on the filtered integral image.

The image generator may be configured to detect a bounding box of the object through a vertical projection and a horizontal projection and generate the image based on the bounding box.

The ROI image generator may be configured to extract a pre-defined ROI including a target of interest of the object from the image, generate an ROI image based on the pre-defined ROI, acquire a width and a height of the target of interest based on the ROI image, resize the ROI image based on a preset distance using the width and the height, and generate the plurality of ROIs based on the resized ROI image.

The object recognition apparatus may further include a validity determiner configured to output validities of the plurality of ROI images using a filter configured to classify the validities and input the plurality of ROI images to the plurality of recognizers based on a result of the outputting.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which.

DETAILED DESCRIPTION

Figure 1:
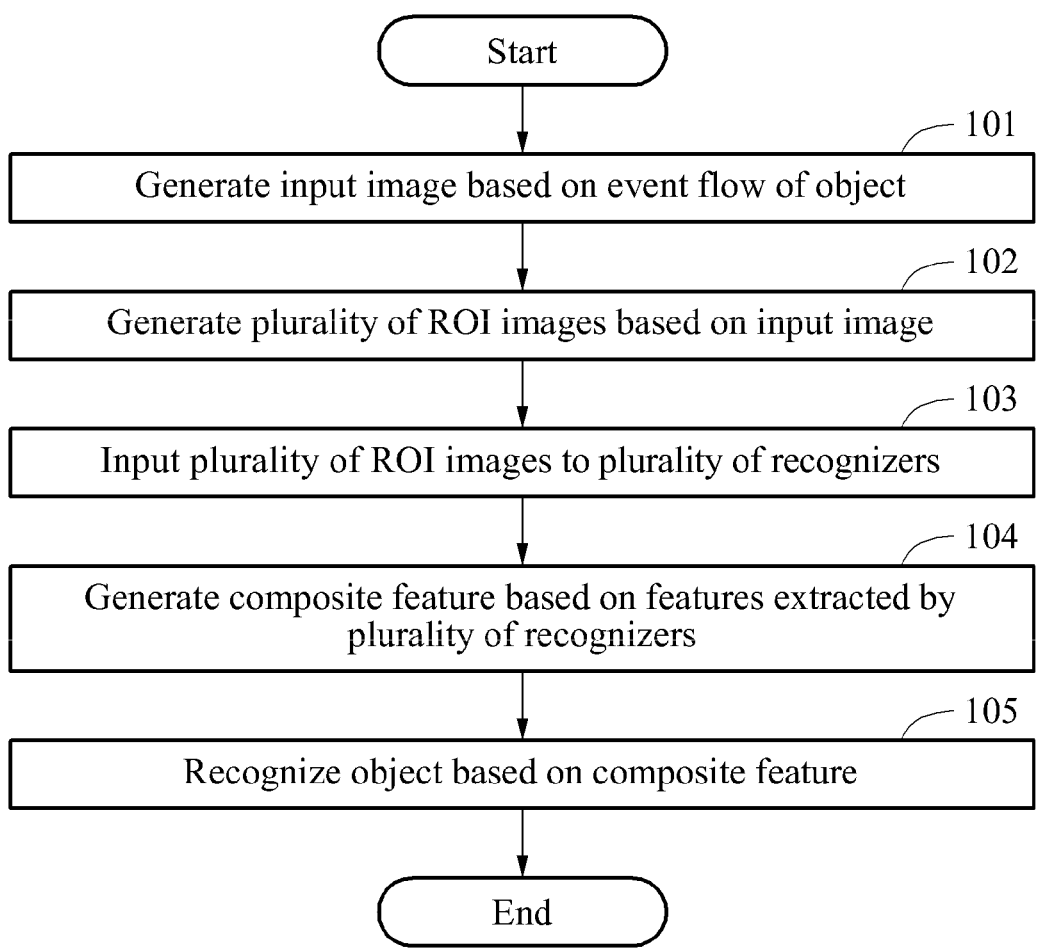
FIG. 1 illustrates an example of an object recognition method according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following specific structural or functional descriptions are exemplary to merely describe the examples, and the scope of the examples is not limited to the descriptions provided in the present specification. On the contrary, exemplary embodiments are to cover all modifications, equivalents, and alternatives falling within the scope of the exemplary embodiments.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

It will be understood that when an element or layer is referred to as being "on", "attached to", or "connected to" another element or layer, it can be directly on or connected to the other element or layer or through intervening elements or layers may be present. In contrast, when an element is referred to as being "directly on", "directly attached to", or "directly connected to" another element or layer, there are no intervening elements or layers present. Other words used to describe the relationship between elements or layers should be interpreted in a like fashion (e.g., "between" versus "directly between," "adjacent" versus "directly adjacent," "on" versus "directly on").

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following exemplary embodiments may be applied to process an input image including a biometric region. A recognizing operation may be performed by, for example, a fingerprint recognizer, a pulse recognizer, and an iris recognizer. Hereinafter, an operation of recognizing a biometric region of a user may include an operation of identifying or authenticating the user by recognizing the biometric region of the user.

Exemplary embodiments may be implemented to be various forms, for example, a personal computer, a laptop computer, a tablet computer, a smartphone, a television, a smart appliance, an intelligent vehicle, a kiosk, and a wearable device. Exemplary embodiments may be applied to process an image for authenticating a user in, for example, a smartphone, a mobile device, and a smart home system. Exemplary embodiments may be applied to a payment service based on a user authentication. Exemplary embodiments may also be applied to an intelligent vehicle system that starts an ignition through a user authentication. Hereinafter, reference will now be made in detail to examples with reference to the accompanying drawings, wherein like reference numerals refer to like elements throughout.

FIG. 1 illustrates an example of an object recognition method according to an exemplary embodiment;

Referring to FIG. 1, in operation 101, the object recognition method generates an input image based on an event flow of an object sensed by an event-based vision sensor.

The event-based vision sensor may sense an event using a plurality of pixels and output an event signal based on an output signal of an activated pixel sensing the event. Each of the plurality of pixels may sense an event in which a brightness of incident light increases or decreases. The event signal may include information for identifying the activated pixel, for example, an address and an index of the activated pixel, and information on a time at which the event is sensed by the activated pixel, for example, a timestamp. The event signal may also include information indicating a type of event, for example, polarity information.

The object recognition method may sense the event flow of the object using the event-based vision sensor, generate the input image based on an event signal flow obtained by accumulating event signals output by the event-based vision sensor with respect to the sensed event flow, and recognize the object based on the generate input image and a pre-registered object. In this example, the event flow may be generated based on a movement of the object.

Figure 2:
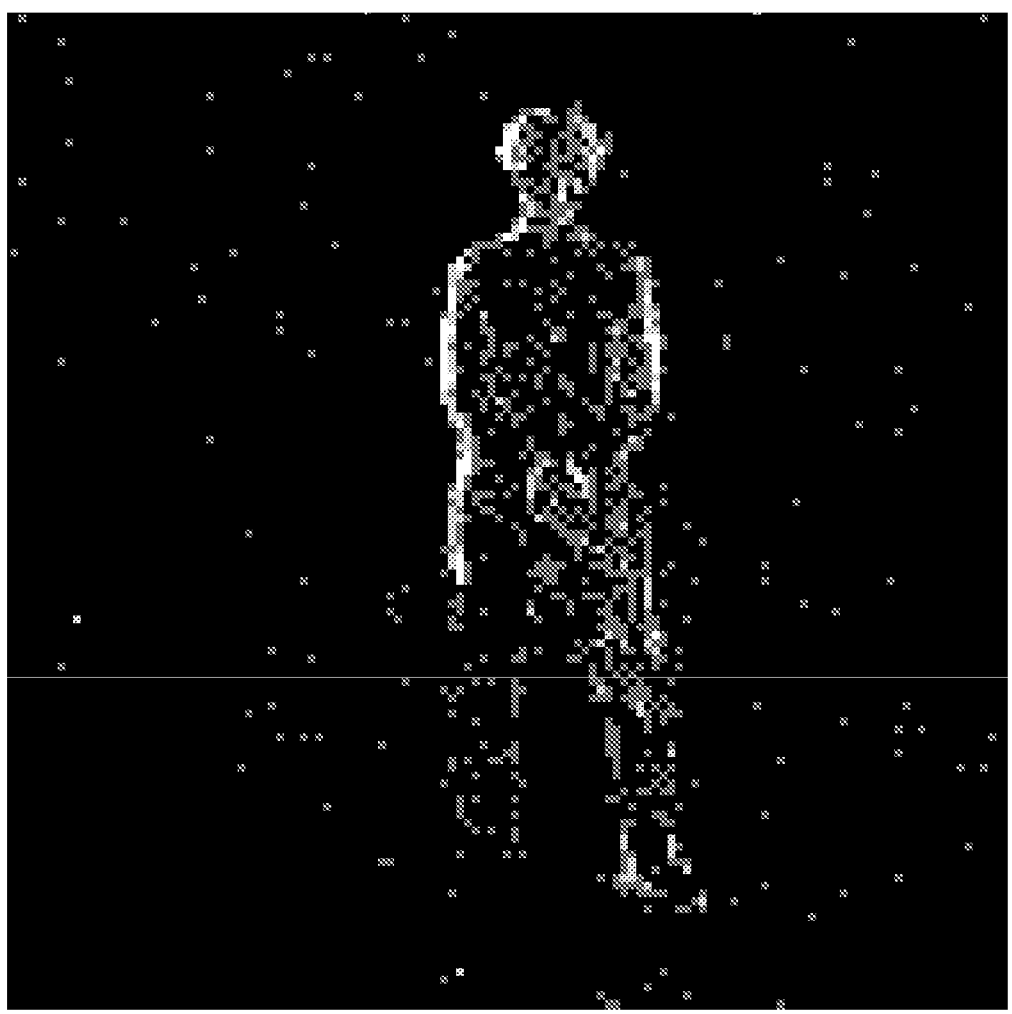
FIG. 2 illustrates an example of an image based on an event flow sensed by an event-based vision sensor according to an exemplary embodiment.

Descriptions related to the event-based vision sensor will be provided with reference to FIG. 2. Descriptions related to generating of the input image based on the object recognition method will be provided with reference to FIGS. 3A through 4.

In operation 102, the object recognition method generates a plurality of ROI images corresponding to a plurality of ROIs defined in advance based on the input image.

When the object is a person, the plurality of ROIs may include regions corresponding to an entire body, a head, an upper half body, a lower half body, a leg, and an arm of the object. Descriptions related to generating of the plurality of ROI images based on the object recognition method will be provided with reference to FIGS. 5A through 5D.

In operation 103, the object recognition method inputs the plurality of ROI images to a plurality of recognizers independently configured to extract features of the plurality of ROIs. Descriptions related to inputting the plurality of ROI images to the plurality of recognizers based on the object recognition method will be provided with reference to FIG. 6.

In operation 104, the object recognition method generates a composite feature based on the features extracted by the plurality of recognizers. Descriptions related to extracting of the features using the plurality of recognizers based on the object recognition method will be provided with reference to FIG. 7.

In operation 105, the object recognition method recognizes the object based on the composite feature. In an example, the object may be recognized by comparing the generated composite feature to a composite feature of a pre-registered object.

In the object recognition method, whether the object is registered may be determined based on a result of the recognizing. When the object is registered, a command corresponding to the registered object may be executed. When the object is a non-registered object, a subsequent operation may not be performed or an alert notification may be provided.

FIG. 2 illustrates an example of an image based on an event flow sensed by an event-based vision sensor according to an exemplary embodiment.

The event-based vision sensor may be, for example, a dynamic vision sensor (DVS). The event-based vision sensor may sense an event and output an event signal. An event flow may indicate an event obtained through accumulation performed for a preset period of time. In an example, the event-based vision sensor may sense the event flow and output an event signal flow.

The event-based vision sensor may respond to an event in which a change in a brightness of a pixel is greater than or equal to a threshold so as to reduce energy consumption and be applicable to a relatively wide range of illumination conditions. Based on a relatively low energy consumption of the event-based vision sensor, a terminal, for example, a mobile device may be transitioned from a standby state to an operating state to quickly collect a signal, and may immediately respond when the user is to unlock the terminal. Based on the wide range of illumination conditions, the event-based vision sensor may also perform an operation by collecting a signal in an environment in which a brightness of a light source is relatively low.

In an object recognition method, an event signal may be collected using the event-based vision sensor having the relatively low energy consumption in real time. When an object moves in a visible range of the event-based vision sensor, the event-based vision sensor may effectively capture a movement of the object. Since the object may be recognized based on an event flow sensed by the event-based vision sensor, the object recognition apparatus may not need to be previously transitioned to an awake state to recognize the object, and the user may not be requested to perform an additional manipulation on a screen of the smart device.

An image generated based on the event signal flow output from the event-based vision sensor may include information on a contour of a moving object and may not include information including, for example, a color and a texture in detail. In an image based on event-based vision sensor, a background in which a movement does not occur is automatically removed from a scene including the moving object. Thus, by using the event-based vision sensor, leakage of information may be prevented and user privacy may be protected. Also, user information may be secured and a sense of experience of a user may be improved.

Referring to FIG. 2, the event-based vision sensor may sense an event flow of a person. An event signal flow of the sensed event flow may be output by the event-based vision sensor, and an image of FIG. 2 may be generated through a conversion of the output event signal flow. In FIG. 2, a white point indicates a point corresponding to an event of light of which a brightness increases and a gray point indicates a point corresponding to an event of light of which a brightness decreases. For ease and convenience of description, points are differently indicated based on a type of event. However, the type of event may not be applied depending on an example.

The smart device performing object recognition may collect the event signal using the event-based vision sensor in real time. When the object moves within the visible range of the event-based vision sensor, the event-based vision sensor may sense the event flow of the object and output the event signal flow.

As an example, when the user moves the smart device from a portion under the head to an ear, the event-based vision sensor that is consistently in an activated state may sense an event flow due to a movement of the user and output an event signal flow of the sensed event flow. In this example, the smart device may collect the event signal flow output from the event-based vision sensor.

Figure 3A:
FIGS. 3A and 3B illustrate an example of generating an input image according to an exemplary embodiment.
Figure 3B:
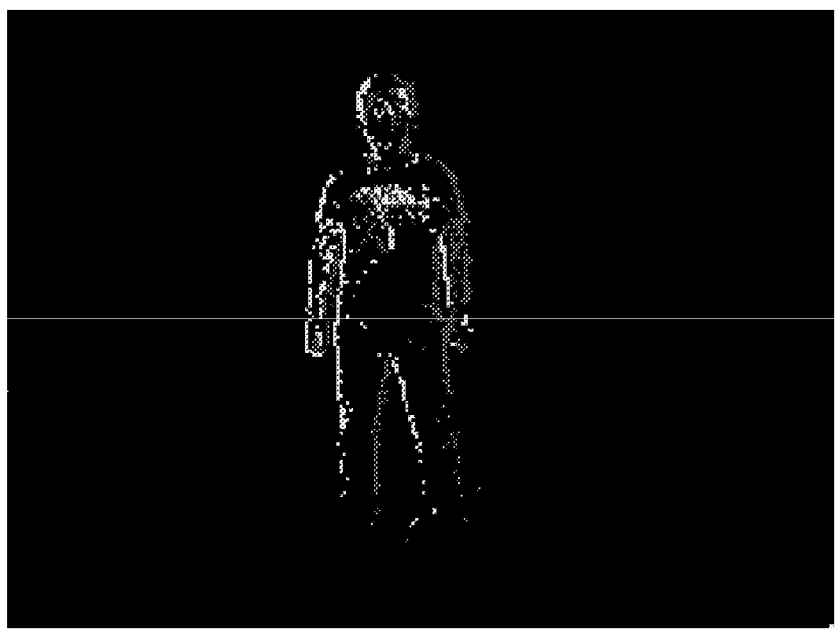

FIGS. 3A and 3B illustrate an example of generating an input image according to an exemplary embodiment.

In an object recognition method, an integral image of a pre-defined time based on an event flow sensed by an event-based vision sensor may be generated.

The event-based vision sensor may sense the event flow and output an event signal flow. The output event signal flow may be converted into the integral image of the pre-defined time. FIG. 3A illustrates an example of a converted integral image. Here, the converted integral image may be, for example, an integral image into which the integral image of the pre-defined time is converted.

The event-based vision sensor may output event signals based on a serial-type communication. As indicated above, an event signal may include identification information of an activated pixel sensing an event and thus, an object recognition apparatus may indicate a position of the activated pixel included in the event signal with a point. The object recognition apparatus may accumulate points corresponding to an event signal satisfying a pre-defined condition to generate the integral image as illustrated in FIG. 3A.

The converted integral image may be filtered by a spatio-temporal filter. FIG. 3B illustrates an example of an image filtered by the spatio-temporal filter.

The spatio-temporal filter may determine whether an event signal flow is noise based on spatio neighbors spatially neighboring each other, a temporal distance indicating a temporal closeness, or a combination of the spatio neighbors and the temporal distance. Whether a corresponding event signal is noise may be determined based on a number of signals generated during a preset period of time and present in a vicinity of the event signal input at a preset point in time.

In the object recognition method, an input image may be generated based on the filtered integral image.

Figure 4:
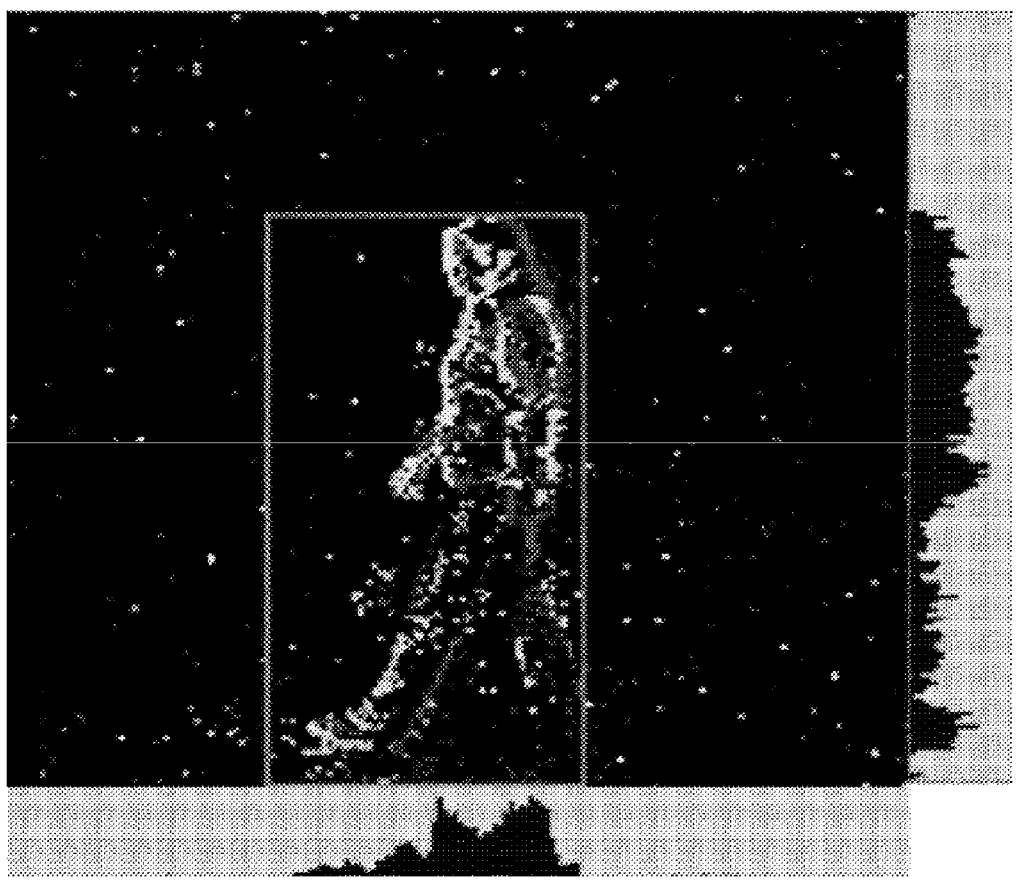
FIG. 4 illustrates another example of generating an input image according to an exemplary embodiment.

FIG. 4 illustrates another example of generating an input image according to an exemplary embodiment.

In an object recognition method, an integral image of a pre-defined time may be generated based on an event flow sensed by an event-based vision sensor, and a bounding box of an object of the generated integral image may be detected. The bounding box may be, for example, an area including appearance information of the object.

Referring to FIG. 4, a bounding box of an object of an integral image generated based on an event flow may be detected. In an example, a bounding box of an object of an integral image filtered based on an example of FIG. 3 may be detected. A bounding box can be a visible box which surrounds the object.

By using the event-based vision sensor, a moving object may also be detected. Thus, the bounding box surrounding the object may be detected through a vertical projection and a horizontal projection.

Referring to FIG. 4, the bounding box may be set based on a gas size for each histogram of vertical and horizontal axes. The vertical projection may be, for example, a scheme of accumulating points having the same X coordinate and representing the points as a horizontal axis histogram in an image including points corresponding to event signals. A region having at least a preset height in the horizontal axis histogram may be determined to be an X-axial region of the bounding box. Also, the horizontal projection may be, for example, a scheme of accumulating points having the same Y coordinate and representing the points as a vertical axis histogram in an image including points corresponding to event signals. A region having at least a preset height in the vertical axis histogram may be determined to be a Y-axial region of the bounding box.

In an example, bordered pixels may be classified by applying an elliptic fitting to an integral image.

In the object recognition method, an input image may be generated based on the detected bounding box.

FIGS. 5A through 5D illustrate an example of generating an ROI image according to an exemplary embodiment.

In an object recognition method, a plurality of ROI images correspond to a plurality of ROIs defined in advance based on a generated input image. When an object is a person, the plurality of ROIs may include at least one of the regions corresponding to an entire body, a head, an upper half body, a lower half body, and an arm of the person.

Figure 5A:
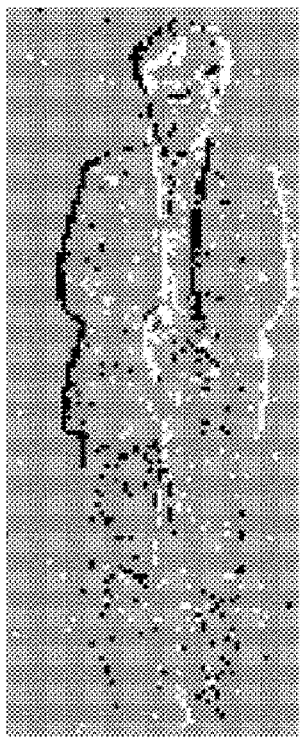
FIGS. 5A through 5D illustrate an example of generating a region of interest (ROI) image according to an exemplary embodiment.

Referring to FIG. 5A, an input image of an object from which a bounding box is detected may be generated. In an example of FIG. 5A, the object may be a person.

Figure 5B:
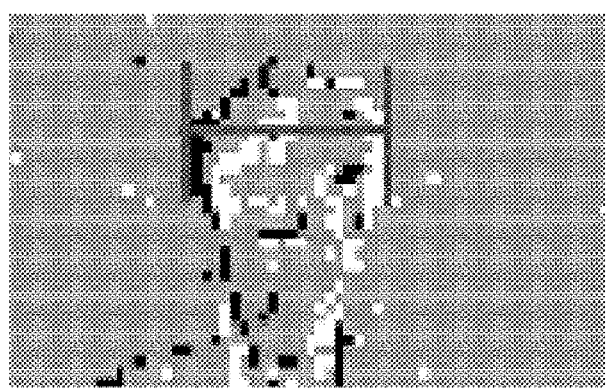

Referring to FIG. 5B, a pre-defined ROI including a target of interest of the object may be extracted from a generated input image, and an ROI image may be generated based on the pre-defined ROI. In an example of FIG. 5B, the target of interest of the person may be a head, and the ROI image may be generated by extracting the pre-defined ROI including the head.

Figure 5C:
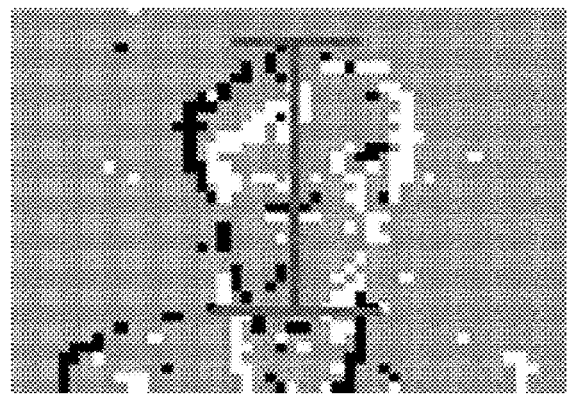

Based on the ROI image, a width and a height of the target of interest may be acquired. In FIG. 5B, a width of the head that is the target of interest of the ROI image may be acquired. The width of the target of interest may be acquired by applying, for example, a vertical projection to the ROI image. In FIG. 5C, a height of the head that is the target of interest of the ROI image may be acquired. The height may be acquired based on a fixed ratio of the target of interest to the width of the target of interest acquired by applying the vertical projection.

Figure 5D:

Referring to FIG. 5D, the ROI image may be resized based on a preset distance using the acquired width and height. Based on the resized ROI image, a plurality of ROI images may be generated.

In the object recognition method, the plurality of ROI images may be generated based on the examples described with reference to FIGS. 5A through 5D. When an object is a person, an ROI including a target of interest, for example, an entire body, a head, an upper half body, an arm, a leg, and a lower half body, may be extracted from an input image, and an ROI image may be generated and resized. Based on resized ROI images, a plurality of ROI images may be generated.

In an example, an ROI image may be normalized based on the method described with reference to FIGS. 5A through 5D. Although FIGS. 5A through 5D illustrate examples of normalization of the ROI image resized based on a preset distance, various normalizations, for example, a normalization of illumination and speed may also be applicable to the plurality of ROI images.

Figure 6:
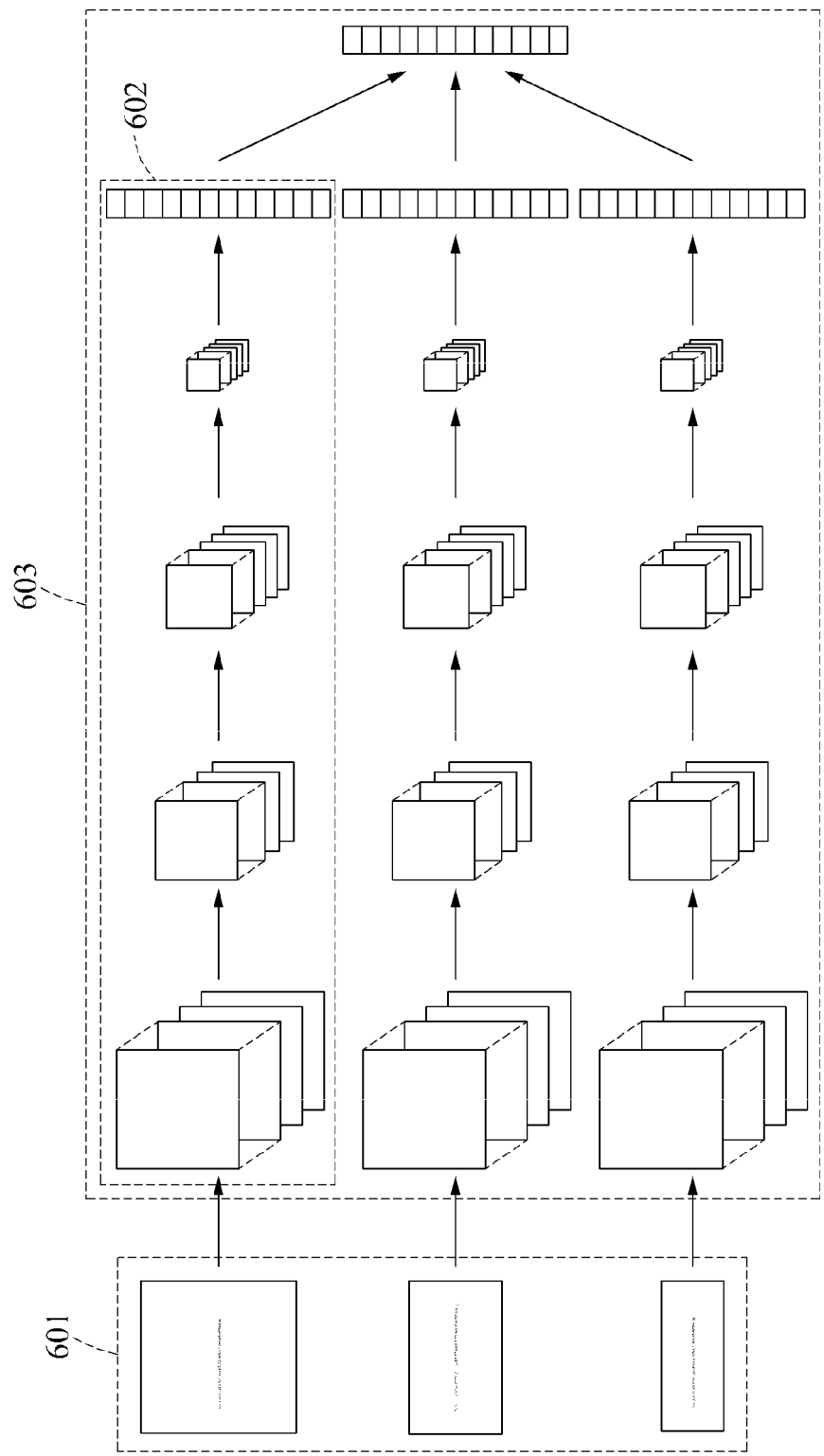
FIG. 6 illustrates an example of generating a composite feature in response to an input of a plurality of ROI images according to an exemplary embodiment.

FIG. 6 illustrates an example of generating a composite feature in response to an input of a plurality of ROI images according to an exemplary embodiment.

Referring to FIG. 6, a plurality of ROI images 601 may be input to a plurality of recognizers independently configured to extract features of a plurality of ROIs. As an example, an input image may be generated based on the method described with reference to FIGS. 3A and 3B, a bounding box may be detected in the input image based on the method described with reference to FIG. 4, and the plurality of ROI images 601 may be generated based on the method described with reference to FIGS. 5A through 5D. The plurality of ROI images 601 may be input to the plurality of recognizers in parallel. Each of the plurality of recognizers may be independently configured to extract the features of the plurality of ROIs, respectively.

In FIG. 6, the plurality of ROIs may correspond to targets of interest, an entire body, an upper half body, and a head of a person. The plurality of recognizers may be independently configured to extract features of the plurality of ROIs corresponding to the entire body, the upper half body, and the head. For example, a recognizer 602 may be trained to extract a feature of an ROI corresponding to the entire body of the person.

Based on the features extracted by the plurality of recognizers, a composite feature may be generated. The extracted features of the plurality of ROIs may be combined with one another, and the composite feature may be generated based on the combined features.

The plurality of recognizers may be, for example, a plurality of convolutional neural networks (CNNs). As an example, a multiple-input CNN (miCNN) 603 may include a plurality of CNNs. The miCNN 603 may have a multiple-input and single-output (MISO) architecture receiving a plurality of ROI images as inputs and outputting a single composite feature. The composite feature extracted using the miCNN 603 may be generated based on a convolution layer, a full connection layer, or various combinations thereof.

The plurality of ROI images to be input to the miCNN 603 may indicate the same object despite differences in resolutions, scales, and positions. The composite feature extracted using the miCNN 603 may be applied to identify the object.

The plurality of recognizers may also be configured to identify a pre-registered object. For example, the plurality of ROI images may be input to the plurality of recognizers, and the plurality of recognizers may be configured to identify the object using images of unregistered objects as sample data. In this example, the plurality of ROI images may have the same label. As an example, the miCNN 603 may be configured to extract a composite feature of an object and identify the object based on the extracted composite feature. As another example, the miCNN 603 may be configured based on a method of optimizing each parameter through a backward propagation.

The composite feature extracted by the plurality of recognizers may be stored in connection with an identifier indicating the object. In a process of registering the user, the user may input the identifier to the smart device through, for example, a button interface and a voice interface, and the smart device may receive the identifier of the user and apply the identifier to register the user.

Although not shown in the drawing, in the object recognition method, whether the plurality of ROI images 601 is to be input may be determined based on the respective validities of the plurality of ROI images 601.

The validities of the plurality of ROI images 601 may be output through a filter configured to classify the validities of the plurality of ROI images 601. Based on a result of the outputting, the plurality of ROI images 601 may be input to the plurality of recognizers.

The filter may be configured to classify validities. For example, a plurality of positive samples and a plurality of negative samples of a pre-defined ROI may be input and features of the input samples may be extracted. By using a support vector machine (SVM), a classifier may be configured to classify validities of the extracted features. The filter may be configured to classify the validities based on the configured classifier.

As such, the filter may filter out, for example, inaccurately detected images and partial images, thereby increasing robustness of the plurality of ROI images 601.

Figure 7:
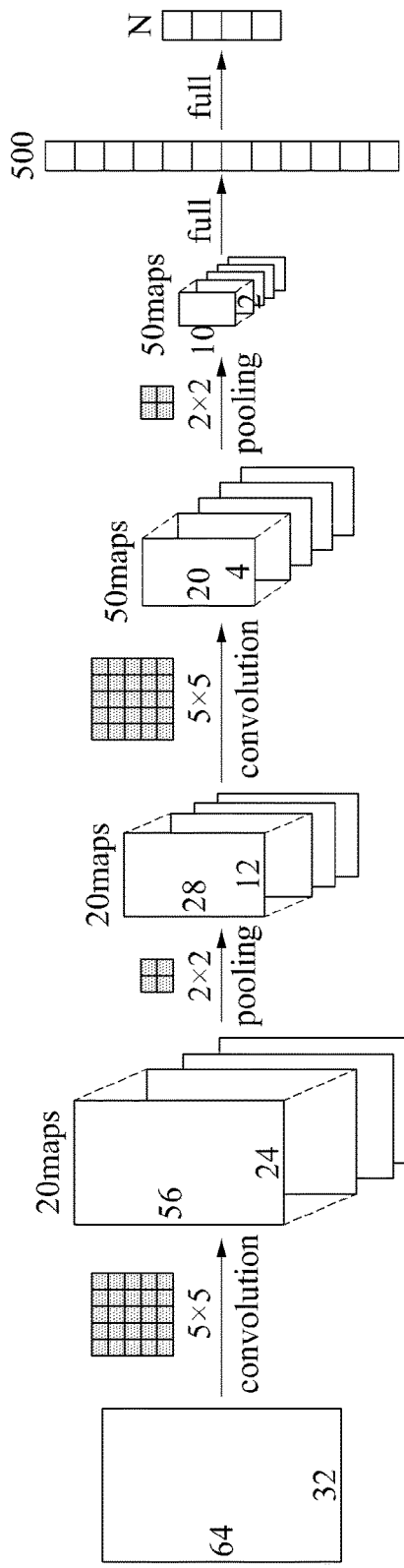
FIG. 7 illustrates an example of extracting a feature of an ROI in response to an input of an ROI image according to an exemplary embodiment.

FIG. 7 illustrates an example of extracting a feature of an ROI in response to an input of an ROI image according to an exemplary embodiment.

In an object recognition method, features of a plurality of ROIs may be extracted from a plurality of ROIs, respectively. In this example, the plurality of ROIs may be input by a plurality of recognizers in parallel. The plurality of recognizers may be configured independently. An example of extracting a feature of an ROI using a recognizer, for example, the recognizer 602 of FIG. 6, will be described with reference to FIG. 7. A recognizer configured to extract a feature of a pre-defined ROI may include a CNN.

The CNN may include a convolution layer, a max-pooling layer, a full connection layer, or various combinations thereof. Referring to FIG. 7, the CNN may include a first convolution layer, a first max-pooling layer, a second convolution layer, a second max-pooling layer, and a full connection layer.

The first convolution layer may perform a convolutional operation on an input ROI image to generate a plurality of maps, for example, 20 maps. The convolutional operation may be performed based on a preset size of kernel, for example, a 5×5 kernel and a preset number of kernels, for example, 20 kernels. The first max-pooling layer may generate a plurality of maps, for example, 50 maps by sampling the first convolution layer. The sampling may be performed based on a preset size, for example, a size of 2×2.

The second convolution layer may perform a convolutional operation on an output of the first max-pooling layer to generate a plurality of maps, for example, 50 maps. The convolutional operation may be performed based on a preset size of kernel, for example, a 5×5 kernel and a preset number of kernels, for example, 50 kernels. The second max-pooling layer may generate a plurality of maps, for example, 50 maps by sampling an output of the second convolution layer. The sampling may be performed based on a preset size, for example, a size of 2×2.

The full connection layer may extract a feature of a pre-defined ROI based on an output of the second max-pooling layer and a full connection network.

In contrast to an example of FIG. 6, a last layer may not be included in a miCNN as illustrated in FIG. 7. In an example, each CNN of the miCNN may include one full connection layer. However, this disclosure is not limited the example, and various examples are applicable thereto.

Also, an input layer of FIG. 7 may be an image capturing a different portion of the same object in a differing size. For example, when the object is a person, a 64×32 input layer may be applied to an entire body, a 32×32 input layer may be applied to an upper half body, and a 20×32 input layer may be applied to a head.

In an example, a sigmoid may be applied to be an activation function of each CNN and a rectified linear unit (ReLU) may be applied to the full connection layer. However, this disclosure is not limited to the example, and various examples are applicable thereto.

Figure 8:
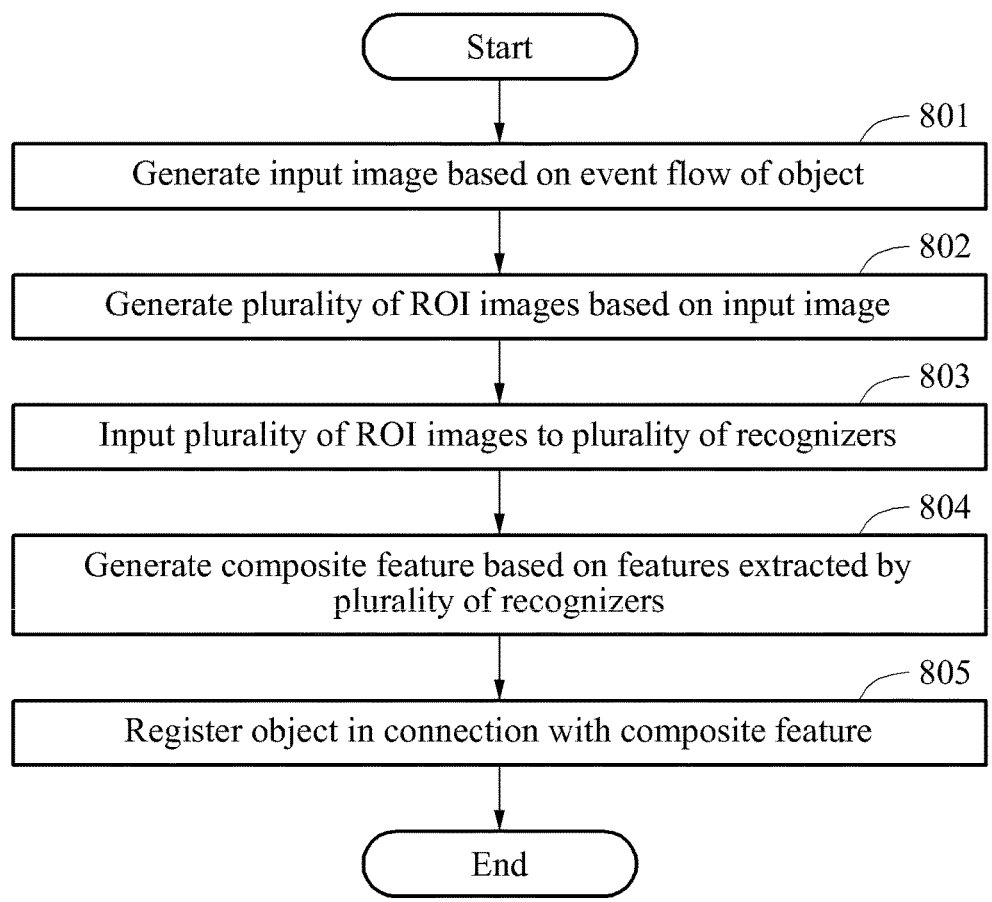
FIG. 8 illustrates an example of an object registration method according to an exemplary embodiment.

FIG. 8 illustrates an example of an object registration method according to an exemplary embodiment.

A composite feature generated based on the object recognition method may be used to register an object. In operation 801, the object registration method generates an input image based on an event flow of an object sensed by an event-based vision sensor.

In an example, a user identity may be registered in a smart device. For a user registration, a user may input a command for the user registration to the smart device through, for example, a button interface and a voice interface. The smart device may receive the input and change an operation mode to a registration mode.

In the registration mode, the smart device may sense an event flow of the user through the event-based vision sensor and collect an event signal flow output from the event-based vision sensor. For example, when the user moves a head in a visible range of the event-based vision sensor in the smart device, an event signal flow output for an event flow sensed by the event-based vision sensor may be collected.

The smart device may perform the user registration on at least one user. The collected event signal flow of the user may be, for example, an event signal flow collected with respect to a body part of the user and an event signal flow collected with respect to an entire body of the user.

In an example, the event-based vision sensor may sense an event in which a pixel brightness variation is greater than or equal to a predetermined degree and transmit or store an event signal of the sensed event. An event signal flow output by the event-based vision sensor may be used by the smart device in the registration mode.

The event signal flow of the user obtained for a preset period of time may be mapped to image data and used to generate the input image through an accumulation.

The smart device may accumulate event signal flows in a preset period of time, for example, 20 milliseconds (ms) and generate an input image corresponding to an event signal flow collected based on a proximity relationship of spaces, an ordinal relationship of responses, and a coordinate position of an event signal for each user. The generated input image may include contour and partial texture information of the user to be registered, and exclude an immovable object from a background.

In operation 802, based on the input image, the object registration method generates a plurality of ROI images corresponding to a plurality of ROIs defined in advance.

In operation 803, the object registration method inputs the plurality of ROI images to a plurality of recognizers independently configured to extract features of the plurality of ROIs. In operation 804, the object recognition method generates a composite feature based on the features extracted by the plurality of recognizers.

In operation 805, the object recognition method registers the object in connection with the composite feature. For example, the registering may be performed by storing, in a database, the object in connection with the composite feature.

In the object recognition method, the object may also be registered in connection with an identifier used to identify the object. The identifier may be used in a process of recognizing the object.

Figure 9:
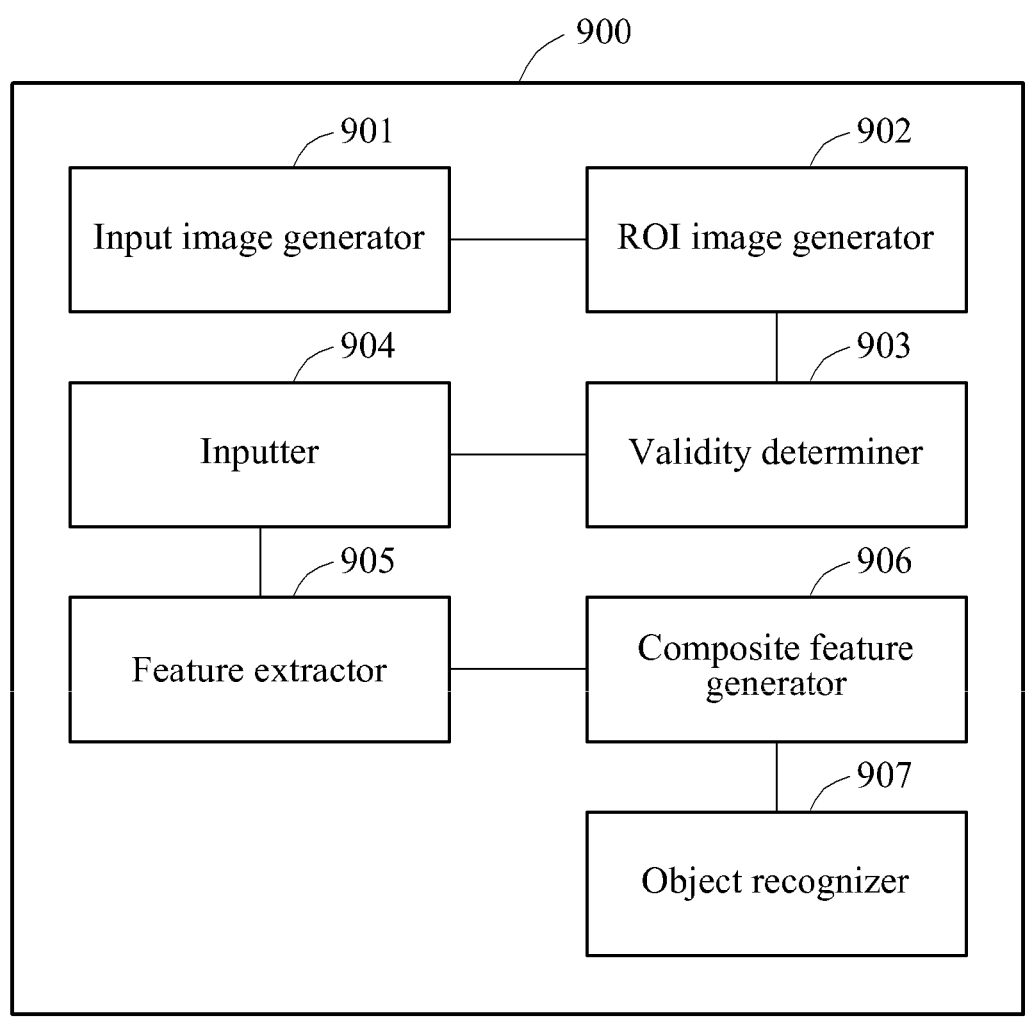
FIG. 9 illustrates an example of an object recognition apparatus according to an exemplary embodiment.

FIG. 9 illustrates an object recognition apparatus 900 according to an exemplary embodiment.

Referring to FIG. 9, the object recognition apparatus 900 includes an input image generator 901, an ROI image generator 902, a validity determiner 903, an inputter 904, a feature extractor 905, a composite feature generator 906, and an object recognizer 907.

The aforementioned examples of generating an input image described with reference to FIGS. 1 through 7 are applicable to the input image generator 901. The aforementioned examples of generating a plurality of ROI images described with reference to FIGS. 1 through 7 are applicable to the ROI image generator 902.

The aforementioned examples of determining validities of a plurality of ROI images described with reference to FIGS. 1 through 7 are applicable to the validity determiner 903. The aforementioned examples of inputting the plurality of ROI images to a plurality of recognizers described with reference to FIGS. 1 through 7 are applicable to the inputter 904.

The aforementioned examples of extracting features of a plurality of ROIs described with reference to FIGS. 1 through 7 are applicable to the feature extractor 905. The aforementioned examples of generating a composite feature described with reference to FIGS. 1 through 7 are applicable to the composite feature generator 906. The aforementioned examples of recognizing an object described with reference to FIGS. 1 through 7 are applicable to the object recognizer 907.

As such, since the descriptions provided with reference to FIGS. 1 through 7 are also applicable here, repeated descriptions with respect to elements included in the object recognition apparatus 900 will be omitted for increased clarity and conciseness.

In an example, based on a motion of an object, a command corresponding to the motion may be executed by matching the command and the motion. For example, a function to receive a call, unlock a vehicle door, and the like may be executed in a smart device performing an object recognition method.

In the object recognition method, an object may be recognized, and a type and a position of a motion object of the recognized object may be identified by the event-based vision sensor. Based on the position of the motion object sequentially identified by the event-based vision sensor, a motion trajectory of the motion object may be determined.

The identifying of the motion object may also be performed by a unit classifier configured based on a signal of an event flow sensed by the event-based vision sensor. The unit classifier may be included in the smart device and configured in advance.

By using the unit classifier, the type of the motion object may be determined based on a current event flow sensed by the event-based vision sensor and a neighboring event flow of the current event flow.

The neighboring event flow may be determined based on the following method. As an example, the neighboring event flow may be determined by selecting an event flow in a spatial range, for example, a square with a size of 80×80 pixels, set around the current event flow from event flows sensed during a time interval set before the event-based vision sensor senses the current event flow.

The type of the motion object may be determined based on the event flow sensed by the event-based vision sensor, and a position of the motion object of the determined type may be determined based on a position of a motion object for each event of the event flow.

For example, a center position of the event flow of a motion object belonging to the same type may be calculated, and the calculated center position may be determined to be a position of the motion object. In an example, the center position may be acquired based on clustering methods. Based on, for example, a K-means clustering method, the center position of the motion object may be acquired and the acquired center position may be applied to track the motion object.

Based on the foregoing, the type and the position of the motion object may be identified and the motion trajectory of the motion object may be determined based on the position of the motion object identified in sequence. The motion trajectory of the motion object may be determined based on a tracking algorithm, for example, a smoothing filter and a sequential tracking algorithm.

When the type and the position of the motion object are identified, validity verification may be performed on the identified type of the motion object, and an incorrectly determined position of the motion object may be removed based on a result of the validity verification. Through this, efficiency in tracking of the motion object may increase, and accuracy in motion identification may be improved.

In the object recognition method, whether the position of the motion object of the identified type is within a range of a valid region may be determined. As a result of regional validity verification, when the position of the motion object is within the range of the valid region, the type of the motion object and the position corresponding to the type of the motion object may be recorded. For example, the position of the motion object may be tracked and the tracked position may be recorded on a tracking unit list. Based on the position of the motion object sequentially recorded on the tracking unit list, the motion trajectory of the motion object may be determined.

The range of the valid region used for the regional validity verification may be determined based on a previously recorded position of a motion object belonging to the same type and a priori knowledge about a corresponding range of a region. As an example, when the motion object is one of the body parts such as a head and a hand of a person, a distance from a position of a currently identified type of motion object, for example, the head or the hand to the previously recorded position of the motion object belonging to the same type may be calculated. When the calculated distance matches a preset condition, for example, a priori knowledge about a typical body shape, the position of the currently identified type of motion object may be determined to be within the range of the valid region.

When a movement of the motion object is suspended due to characteristics of an image generated based on the event signal flow output from the event-based vision sensor, a loss of the motion trajectory of the motion object based on the event sensed by the event-based vision sensor may occur. Thus, consecutive tracking may be performed on different motion objects based on the tracking unit list, and a smoothing processing may be performed on a movement position. In this example, the smoothing processing may be performed using, for example, a Kalman filter.

Based on the motion trajectory of the motion object, a command matching may be performed on a command corresponding to the motion trajectory. For example, a trajectory feature may be extracted from the motion trajectory of the motion object, a database may be searched to verify whether a feature matching the extracted trajectory feature is previously stored in the database, and, based on a result of the searching, a command corresponding to a found feature may be matched to the command corresponding to the motion trajectory of the motion object.

The database may store a trajectory feature corresponding to a motion object for each type in advance, and store a preset command corresponding to the motion trajectory. The present command may include, for example, a command to operate a mobile phone and a command to unlock a vehicle door.

A function corresponding to a matching command may be executed. As an example, when an identified type of motion object is a nose or an ear, a motion trajectory of the nose or the ear may be determined, a command matching may be performed on a command corresponding to the determined motion trajectory based on the motion trajectory, and a function corresponding to a matching command may be executed. As another example, a type of motion object may be identified to be a nose, an eye, or a finger, a command matching may be performed on an auto-unlock/danger alert command based on the motion trajectory of the nose, the eye, or the finger, and an auto-unlock/danger alert function may be executed.

Based on the object recognition method, user recognition may be performed in a smartphone. As a user recognition result, when a registered user is identified, the smartphone may be unlocked. The smartphone may collect an event signal flow through the event-based vision sensor of which energy consumption is relatively low, in real time. Also, the smartphone may identify a motion trajectory of the user, perform a command matching on the identified motion trajectory, and execute a function corresponding to a matching command. The executed function may include, for example, a function to receive a call and an auto-play function.

When the registered user holds the smartphone with one hand and shakes the smartphone based on a preset motion trajectory, the smartphone may be unlocked. In this example, the user may not need to manipulate the smartphone through, for example, a touch interface, with the one hand while holding the smartphone. The user may not also need to manipulate the smartphone with the other hand to unlock the smartphone. Thus, the user may use the smartphone with an increased convenience.

To receive an incoming call, the user may bring the smartphone to the ear based on a preset motion trajectory and answer the call without touching or swiping a screen of the smartphone, thereby experiencing an increased convenience. Also, when the user is not identified as the registered user, the smartphone may remain locked and the function to receive a call may not be executed, thereby enhancing a security.

In an example, the smart device may be smart glasses, which assist a visually impaired user with navigation. When the visually impaired user wears smart glasses including an object recognition apparatus using the event-based vision sensor, the smart glasses may collect an event signal flow of a moving object in the front of the user while the user is walking, and perform an object recognition based on the collected event signal flow. Based on an identified object, an audible or sensible notification about a front road marking or a danger facility may be provided to the visually impaired user. Since the energy consumption of the event-based vision sensor is relatively low, the event-based vision sensor may sense an event consistently in an activated state and, thus, may be appropriately used by the visually impaired user instead of the navigation that requires a relatively long standby time.

In another example, the smart device may be a vehicle including the object recognition apparatus using the event-based vision sensor. As an example, the event-based vision sensor may be installed in an upper portion of a door of the vehicle to collect an event signal in real time. In this example, when a user of the vehicle approaches the vehicle, the event-based vision sensor may immediately collect motion trajectory information or facial information of the user of the vehicle, and execute a function, for example, to automatically unlock the door and switch on an electrical connection in the vehicle. Through this, a simple manipulation and an advanced sense of experience may be provided to the user. Also, the vehicle may execute the function in response to an input of the registered user only, thereby enhancing a vehicular security.

In still another example, the smart device may be a smart television (TV) including the object recognition apparatus using the event-based vision sensor. As an example, the event-based vision sensor may be mounted on a top of the smart TV to collect an event signal flow. When a user moves in a visible range of the event-based vision sensor, the object recognition apparatus may collect an event signal flow, for example a face and an entire body, of the user and perform object recognition. As a result of the object recognition, when the user is identified as a registered user, the smart TV may show a channel history or change a channel to a favorite channel of the user, which is automatically verified in advance. When the user is not identified as the registered user, the smart TV may block a preset channel, and may suspend an execution of an on-air function after a preset period of time elapses. Through the object recognition apparatus, the smart TV may recognize the user and restrict an access of a user by, for example, setting a TV watching time for kids, thereby improving a sense of experience.

The above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present inventive concept is not limited thereto. Instead, it will be appreciated by those skilled in the art that changes may be made to these exemplary embodiments without departing from the principles and spirit of the disclosure, the scope of which is defined by the claims and their equivalents.

What is claimed is:

1. An object recognition method comprising:
   generating an image based on an event flow of an object;
   generating, based on the generated image, a plurality of region of interest (ROI) images corresponding to a plurality of ROIs;
   inputting the plurality of ROI images to a plurality of recognizers, the recognizers being configured to extract features of the plurality of ROIs;
   generating a composite feature based on the features extracted by the plurality of recognizers; and
   recognizing the object based on the composite feature.

2. The object recognition method of claim 1, further comprising:
   extracting, by each of the plurality of recognizers, the features of the plurality of ROIs from the plurality of ROI images, respectively,
   wherein the plurality of ROI images is input to the plurality of recognizers in parallel.

3. The object recognition method of claim 1, wherein the generating of the composite feature comprises:
   combining the features extracted by the plurality of recognizers; and
   generating the composite feature based on a result of the combining.

4. The object recognition method of claim 1, wherein the plurality of recognizers comprises a multiple-input convolutional neural network (CNN) including a plurality of CNNs, and the multiple-input CNN has a multiple-input and single-output (MISO) architecture configured to extract the composite feature for identifying the object from the plurality of ROI images input to the plurality of CNNs in parallel.

5. The object recognition method of claim 1, wherein at least one of the plurality of recognizers comprises:
a convolution layer to perform a convolutional operation on an input ROI image;
a pooling layer to sample an output of the convolution layer; and
a full connection layer to extract a feature of an ROI based on a full connection network and an output of the pooling layer.

6. The object recognition method of claim 1, wherein when the object is a person, the plurality of ROIs comprises at least one from among regions corresponding to an entire body, a head, an upper half body, a lower half body, a leg, and an arm.

7. The object recognition method of claim 1, wherein the generating of the image comprises:
detecting a bounding box of the object through a vertical projection and a horizontal projection; and
generating the image based on the bounding box.

8. The object recognition method of claim 1, wherein the generating of the plurality of ROI images comprises:
extracting a pre-defined ROI including a target of interest of the object from the image;
generating a ROI image based on the pre-defined ROI;
acquiring a width and a height of the target of interest based on the ROI image;
resizing the ROI image based on a preset distance using the width and the height; and
generating the plurality of ROIs based on the resized ROI image.

9. The object recognition method of claim 8, wherein the acquiring comprises:
acquiring the width of the target of interest by applying a vertical projection to the ROI image; and
acquiring the height of the target of interest based on a fixed ratio of the target of interest to the width.

10. The object recognition method of claim 1, further comprising:
outputting validities of the plurality of ROI images using a filter configured to classify the validities; and
inputting the plurality of ROI images to the plurality of recognizers based on a result of the outputting.

11. The object recognition method of claim 1, wherein the generating of the image comprises:
generating an integral image of a pre-defined time based on the event flow;
filtering the integral image using a spatio-temporal filter; and
generating the image based on the filtered integral image.

12. An object registration method comprising:
generating an image based on an event flow of an object;
generating, based on the image, a plurality of region of interest (ROI) images corresponding to a plurality of ROIs;
inputting the plurality of ROI images to a plurality of recognizers, the recognizers being configured to extract features of the plurality of ROIs;
generating a composite feature based on the features extracted by the plurality of recognizers; and
registering the object in connection with the composite feature.

13. An object recognition apparatus comprising:
a processor; and
a memory storing instructions executable by the processor,
wherein the processor is configured to:
generate an image based on an event flow of an object;
generate a plurality of ROI images corresponding to a plurality of ROIs, based on the image;
input the plurality of ROI images to a plurality of recognizers, the recognizers being configured to extract features of the plurality of ROIs;
generate a composite feature based on the features extracted by the plurality of recognizers; and
recognize the object based on the composite feature.

14. The object recognition apparatus of claim 13,
wherein the processor is further configured to extract the features of the plurality of ROIs from the plurality of ROI images, respectively,
wherein the plurality of ROI images is input to the plurality of recognizers in parallel.

15. The object recognition apparatus of claim 13, wherein the processor is further configured to combine the features extracted through the plurality of recognizers and generate the composite feature based on a result of the combining.

16. The object recognition apparatus of claim 13, wherein the plurality of recognizers comprises a multiple-input convolutional neural network (CNN) including a plurality of CNNs, and
the multiple-input CNN has a multiple-input and single-output (MISO) architecture configured to extract the composite feature for identifying the object from the plurality of ROI images input to the plurality of CNNs in parallel.

17. The object recognition apparatus of claim 13, wherein the processor is further configured to generate an integral image of a pre-defined time based on the event flow, filter the integral image using a spatio-temporal filter, and generate the image based on the filtered integral image.

18. The object recognition apparatus of claim 13, wherein the processor is further configured to detect a bounding box of the object through a vertical projection and a horizontal projection and generate the image based on the bounding box.

19. The object recognition apparatus of claim 13, wherein the processor is further configured to:
extract a pre-defined ROI including a target of interest of the object from the image;
generate an ROI image based on the pre-defined ROI;
acquire a width and a height of the target of interest based on the ROI image;
resize the ROI image based on a preset distance using the width and the height; and
generate the plurality of ROIs based on the resized ROI image.

20. The object recognition apparatus of claim 13,
wherein the processor is further configured to output validities of the plurality of ROI images using a filter configured to classify the validities and input the plurality of ROI images to the plurality of recognizers based on a result of the outputting.

21. The object recognition method of claim 1, wherein the object is sensed by an event-based vision sensor.

22. The object recognition method of claim 1, wherein the plurality of ROIs is defined in advance.

23. The object recognition method of claim 12, wherein the object is sensed by an event-based vision sensor.

24. The object recognition method of claim 12, wherein the plurality of ROIs is defined in advance.

25. The object recognition apparatus of claim 13, wherein the object is sensed by an event-based vision sensor.

26. The object recognition apparatus of claim 13, wherein the plurality of ROIs is defined in advance.

* * * * *